US012168964B2

(12) United States Patent
Boileau et al.

(10) Patent No.: US 12,168,964 B2
(45) Date of Patent: Dec. 17, 2024

(54) THRUST REVERSER WITH CASCADES OF MOBILE VANES, COMPRISING A REAR STRUCTURE SUPPORTING THE CASCADES OF VANES AND INCORPORATING AN ACOUSTIC FUNCTION

(71) Applicant: SAFRAN NACELLES, Gonfreville-l'Orcher (FR)

(72) Inventors: Patrick Boileau, Moissy-Cramayel (FR); Julien Chandelier, Moissy-Cramayel (FR); Fabien Jourdan, Moissy-Cramayel (FR); Philippe Wiertel, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/560,510

(22) PCT Filed: May 13, 2022

(86) PCT No.: PCT/FR2022/050920
§ 371 (c)(1),
(2) Date: Nov. 13, 2023

(87) PCT Pub. No.: WO2022/243627
PCT Pub. Date: Nov. 24, 2022

(65) Prior Publication Data
US 2024/0254944 A1      Aug. 1, 2024

(30) Foreign Application Priority Data
May 17, 2021   (FR) ........................ 2105116

(51) Int. Cl.
*F02K 1/72*      (2006.01)
*F02K 1/82*      (2006.01)

(52) U.S. Cl.
CPC ............... *F02K 1/72* (2013.01); *F02K 1/827* (2013.01)

(58) Field of Classification Search
CPC .............. F02K 1/70; F02K 1/72; F02K 1/827
See application file for complete search history.

(56) References Cited

U.S. PATENT DOCUMENTS 4,998,409 A * 3/1991 Mutch ...................... F02K 1/72
                                                        239/265.29
5,575,147 A * 11/1996 Nikkanen ............... F02K 1/625
                                                        239/265.29

(Continued)

FOREIGN PATENT DOCUMENTS

FR     2 981 989 A1    5/2013
FR     2 999 239 A1    6/2014

(Continued)

OTHER PUBLICATIONS

International Search Report Issued Sep. 12, 2022, in PCT/FR2022/050920, filed on May 13, 2022, citing documents 1-2 & 19 therein, 2 pages.

*Primary Examiner* — Craig Kim
(74) *Attorney, Agent, or Firm* — Oblon, McClelland, Maier & Neustadt, L.L.P.

(57) ABSTRACT

A thrust reverser for an aircraft propulsion unit, including a fixed structure, at least one cowl and a plurality of cascades of deflection vanes, the cowl and the cascades of vanes forming a system capable of translational movement relative to the fixed structure along a longitudinal central axis, the mobile system further including at least one rear cascade-support structure to which a rear end of the cascades of vanes is fixed, the rear structure extending in a circumferential direction of the reverser. The rear structure incorporates an acoustic-absorption device including an array of cells and a skin covering the cells, the skin having a first (Continued)

surface arranged facing the cells, and a second surface bounding part of a secondary flow path.

9 Claims, 9 Drawing Sheets

(56) References Cited

U.S. PATENT DOCUMENTS

| | | | | |
|---|---|---|---|---|
| 5,806,302 | A * | 9/1998 | Cariola | F02K 1/09 239/265.29 |
| 5,927,647 | A * | 7/1999 | Masters | F02K 1/72 244/110 B |
| 6,170,254 | B1 * | 1/2001 | Cariola | F02K 1/72 244/110 B |
| 6,557,799 | B1 * | 5/2003 | Sternberger | G10K 11/16 244/1 N |
| 8,201,390 | B2 * | 6/2012 | Sternberger | F02K 1/72 239/265.33 |
| 9,140,211 | B2 * | 9/2015 | Metezeau | F02K 1/827 |
| 9,169,805 | B2 * | 10/2015 | Vauchel | B64D 29/08 |
| 9,850,850 | B2 * | 12/2017 | Aten | F02C 7/20 |
| 11,939,936 | B2 * | 3/2024 | Jodet | G10K 11/172 |
| 2001/0048048 | A1 * | 12/2001 | Riedel | G10K 11/16 244/53 B |
| 2015/0108248 | A1 * | 4/2015 | Aten | F02K 1/72 239/265.19 |
| 2015/0285185 | A1 * | 10/2015 | Caruel | F02K 1/72 239/265.19 |
| 2015/0308380 | A1 * | 10/2015 | Biset | F02K 1/763 60/226.2 |
| 2017/0226962 | A1 * | 8/2017 | Crawford | F04D 29/522 |
| 2017/0328306 | A1 * | 11/2017 | Chmielewski | F02K 3/06 |
| 2019/0017469 | A1 * | 1/2019 | Morgan | F02K 1/70 |
| 2019/0337632 | A1 * | 11/2019 | Berry | F02C 7/24 |
| 2020/0003124 | A1 * | 1/2020 | Curaudeau | B64D 29/00 |
| 2020/0018258 | A1 * | 1/2020 | Aziz | F02K 1/605 |
| 2020/0386184 | A1 * | 12/2020 | Boileau | F02K 1/827 |
| 2021/0190005 | A1 * | 6/2021 | Caruel | B64D 29/06 |
| 2021/0239047 | A1 * | 8/2021 | Boileau | F02C 7/20 |
| 2021/0293202 | A1 * | 9/2021 | Billault | F02K 1/805 |
| 2023/0089038 | A1 * | 3/2023 | Poli | F02K 1/68 60/226.2 |
| 2023/0286640 | A1 * | 9/2023 | G | F02C 7/24 |
| 2024/0124148 | A1 * | 4/2024 | Chelin | F02K 1/763 |
| 2024/0124149 | A1 * | 4/2024 | Delarue | F02K 1/827 |
| 2024/0133351 | A1 * | 4/2024 | Belin | F02K 1/763 |

FOREIGN PATENT DOCUMENTS

| | | | | |
|---|---|---|---|---|
| FR | 3 002 785 | A1 | 9/2014 | |
| FR | 3 073 572 | A1 | 5/2019 | |
| FR | 3 095 673 | A1 | 11/2020 | |
| WO | WO-2020224889 | A1 * | 11/2020 | F02K 1/72 |
| WO | WO-2022243627 | A1 * | 11/2022 | F02K 1/72 |

* cited by examiner

THRUST REVERSER WITH CASCADES OF MOBILE VANES, COMPRISING A REAR STRUCTURE SUPPORTING THE CASCADES OF VANES AND INCORPORATING AN ACOUSTIC FUNCTION

TECHNICAL FIELD

The invention relates to the field of thrust reversers for an aircraft propulsion unit and, more particularly, to reversers with movable cascades.

PRIOR ART

Thrust reversers are devices for diverting forward the airflow passing through the propulsion unit, so as to shorten the landing distances and to limit the stress on the brakes on the landing gear.

The reversers with cascades currently used in the aeronautical sector comprise a front frame forming, with the cascades, a fixed part of the reverser intended to be connected to a turbomachine casing.

More recent technical developments have made it possible to develop reversers with movable cascades, as described for example in the documents FR2981989A1, FR2999239A1, FR3002785A1 and FR3073572A1.

Compared with a conventional reverser with fixed cascades, the mobility of the cascades makes it possible to reduce the length of the nacelle and, consequently, to reduce its mass as well as the drag that it generates.

The known reversers with movable cascades of the prior art have already been the subject of several developments. Nevertheless, there remains a need to improve the acoustic function, which remains a constant major preoccupation in the aeronautical field.

DESCRIPTION OF THE INVENTION

To meet this need, the object of the invention is first of all a thrust reverser for an aircraft propulsion unit, having a longitudinal central axis and comprising a fixed structure, at least one cowl and a plurality of diversion cascades, the cowl and the cascades forming a system able to move in translation with respect to the fixed structure along the longitudinal central axis, between an advanced direct-thrust position and a retracted thrust-reversal position, the movable system furthermore comprising at least one rear structure for supporting the cascades on which a rear end of at least several of the plurality of diversion cascades are secured, said at least one rear cascade support structure extending in a circumferential direction of the reverser.

According to the invention, said at least one rear cascade-support structure incorporates an acoustic absorption device comprising a lattice of cells and a skin covering the cells, the skin including a first surface arranged facing the cells, and a second surface opposite to the first, radially delimiting towards the outside a part of a secondary gas-flow duct, in the advanced direct-thrust position of the movable system.

The invention advantageously makes provision for functionalising the rear cascade-support structure, by conferring thereon an additional acoustic function, while procuring high aerodynamic performances by virtue of the second surface of the acoustic skin delimiting part of the secondary duct of the propulsion unit.

Preferably, the invention provides at least any one of the following optional technical features, considered separately or in combination.

Preferably, the cowl is able to move in rotation about a pivot axis between a closed flight position and an open maintenance position, said at least one rear cascade-support structure comprising an axial connection member intended to cooperate with a complementary axial connection member provided on a front end of the cowl, when the latter is in the closed flight position. With this design, the rear structure consequently incorporates a supplementary function, that of the axial connection with the cowl when the latter is in the closed flight position.

Preferably, said at least one rear cascade-support structure includes a core extending in the circumferential direction of the reverser.

According to a first preferred embodiment of the invention, in said at least one rear cascade-support structure, the lattice of cells is at least partially defined by cell walls produced in a single piece with the core of said at least one rear structure, so as also to form elements stiffening this core.

According to a second preferred embodiment of the invention, in said at least one rear cascade-support structure, the lattice of cells is at least partially defined by cell walls produced in a single piece with the skin, and housed in at least one cavity of the core.

According to a third preferred embodiment of the invention, in said at least one rear cascade-support structure, the lattice of cells is at least partially defined by one or more cellular structures attached between the core and the skin, in at least one cavity of the core.

It should be noted that these three preferred embodiments can be combined, without departing from the scope of the invention.

Preferably, at least one rear cascade-support structure includes at least one of the following elements, or even several of them:
  a member connecting with an actuator of the reverser;
  a member connecting with a track for guiding in translation provided on the movable system; and
  a member for radial centring of the movable system.

Preferably, the fixed structure includes a diversion edge that splays radially outwards while going towards the rear, to delimit an airflow intended to pass through the cascades when the movable system is in the retracted thrust-reversal position.

Preferably, the skin has a front axial end facing or in contact with the diversion edge of the fixed structure, when the movable system is in the advanced direct-thrust position. This advantageously makes it possible to limit leakages on the secondary duct, in the advanced direct-thrust position of the movable system.

Finally, another object of the invention is an aircraft propulsion unit, comprising a turbomachine and a thrust reverser as described hereinabove.

Other advantages and features of the invention will appear in the non-limiting detailed description hereinbelow.

BRIEF DESCRIPTION OF THE DRAWINGS

The following detailed description refers to the accompanying drawings in which.

DETAILED DESCRIPTION OF EMBODIMENTS

Figure 1:
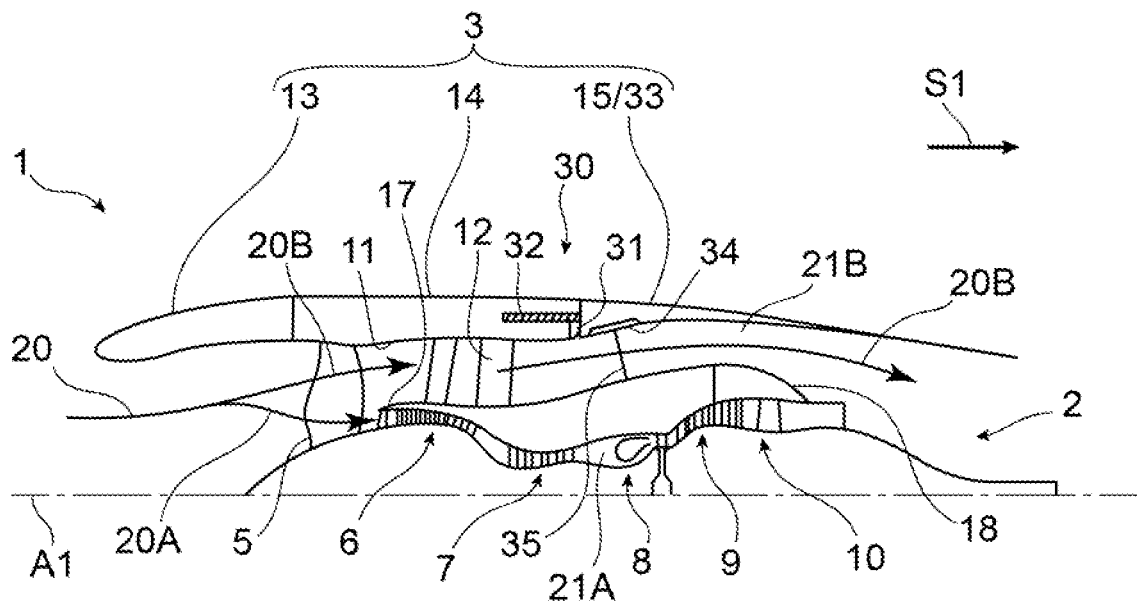
FIG. 1 is a schematic longitudinal sectional half-view of a propulsion unit, comprising a thrust reverser shown in a direct-thrust configuration.
Figure 2:
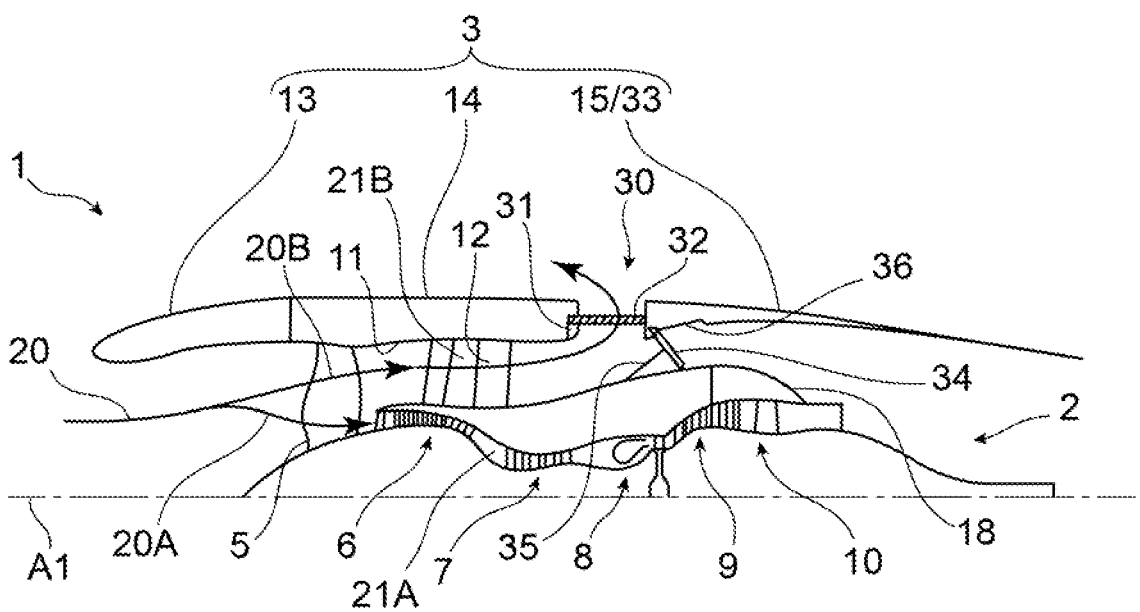
FIG. 2 is a schematic half-view in longitudinal section of the propulsion unit shown on FIG. 1, with the reverser shown in a thrust-reversal configuration.

FIGS. 1 and 2 show an aircraft propulsion unit 1 having a longitudinal central axis A1.

Hereinafter, the terms "front" and "rear" are defined with respect to a general direction S1 of gas flow through the propulsion unit 1 along the axis A1 when it generates a thrust. These terms "front" and "rear" could respectively be replaced by the terms "upstream" and "downstream", with the same meaning.

The propulsion unit 1 comprises a turbomachine 2, a nacelle 3 and a mast (not shown) intended to connect the propulsion unit 1 to a wing (not shown) of the aircraft.

The turbomachine 2 is in this example a bypass twin-spool turbojet engine comprising, from front to rear, a fan 5, a low-pressure compressor 6, a high-pressure compressor 7, a combustion chamber 8, a high-pressure turbine 9 and a low-pressure turbine 10. The compressors 6 and 7, the combustion chamber 8 and the turbines 9 and 10 form a gas generator. The turbojet engine 2 is provided with a fan casing 11 connected to the gas generator by structural arms 12.

The nacelle 3 comprises a front section forming an air inlet 13, a middle section which includes fan cowls 14 covering the fan casing 11, and a rear section 15.

In operation, an air flow 20 enters the propulsion unit 1 through the air inlet 13, passes through the fan 5 and then splits into a primary flow 20A and a secondary flow 20B.

The primary flow 20A flows in a primary gas flow duct 21A passing through the gas generator.

The secondary flow 20B flows in a secondary duct 21B surrounding the gas generator. The secondary duct 21B is delimited radially inwards by a fixed internal fairing that surrounds the gas generator. In this example, the fixed internal fairing comprises a first portion 17 belonging to the middle section 14, and a second portion 18 extending towards the rear from the first portion 17, so as to form a part of the rear section 15.

Radially outwards, the secondary duct 21B is delimited by the fan casing 11 and, in the configuration in FIG. 1, by movable cowls forming the rear section 15 of the nacelle 3, which will be described subsequently.

The nacelle 3 comprises a thrust reverser 30 comprising firstly a fixed structure 31 secured to the fan casing 11 and secondly a structure movable with respect to the fixed structure 31. This movable structure of the reverser 30 comprises a plurality of diversion cascades 32, the aforementioned movable cowls 33, and closure flaps 34 and linkages 35.

FIG. 1 shows the reverser 30 in a direct-thrust configuration. In this configuration, the movable cowls 33 and the whole of the movable system are in a closed position, or advanced position, in which the cowls 33 are in abutment on the fixed structure 31. In this same position of the movable system, the cascades 32 are housed in a space delimited radially by the fan casing 11 on the one hand and by the fan cowls 14 on the other hand. In direct-thrust configuration, the closure flaps 34 are retracted within a cavity 36 (see FIG. 2) formed by the movable cowls 33. The reverser 30 thus makes it possible to channel the secondary flow 20B towards the rear of the propulsion unit 1, so as to generate a thrust. Thus, on FIG. 1, the cascades 32 and the movable cowls 33, which are axially integral with each other, are in an advanced so-called direct-thrust position.

FIG. 2 shows the same reverser 30 in a thrust-reversal configuration. In this configuration, the movable cowls 33 and the whole of the movable system are in an open position, or retracted position, in which the cowls 33 are longitudinally distant from the fixed structure 31 so as to define a radial opening of the secondary duct 21B. The cascades 32 extend through this radial opening. In this thrust-reversal configuration, the closure flaps 34 are deployed radially in the secondary duct 21B so as to direct the secondary flow 20B towards the cascades 32, which orients the flow thus redirected towards the front of the propulsion unit 1, for the purpose of generating a counter-thrust. Thus, on FIG. 2, the cascades 32 and the movable cowls 33 of the movable system are shown in a retracted so-called thrust-reversal position.

Figure 3:
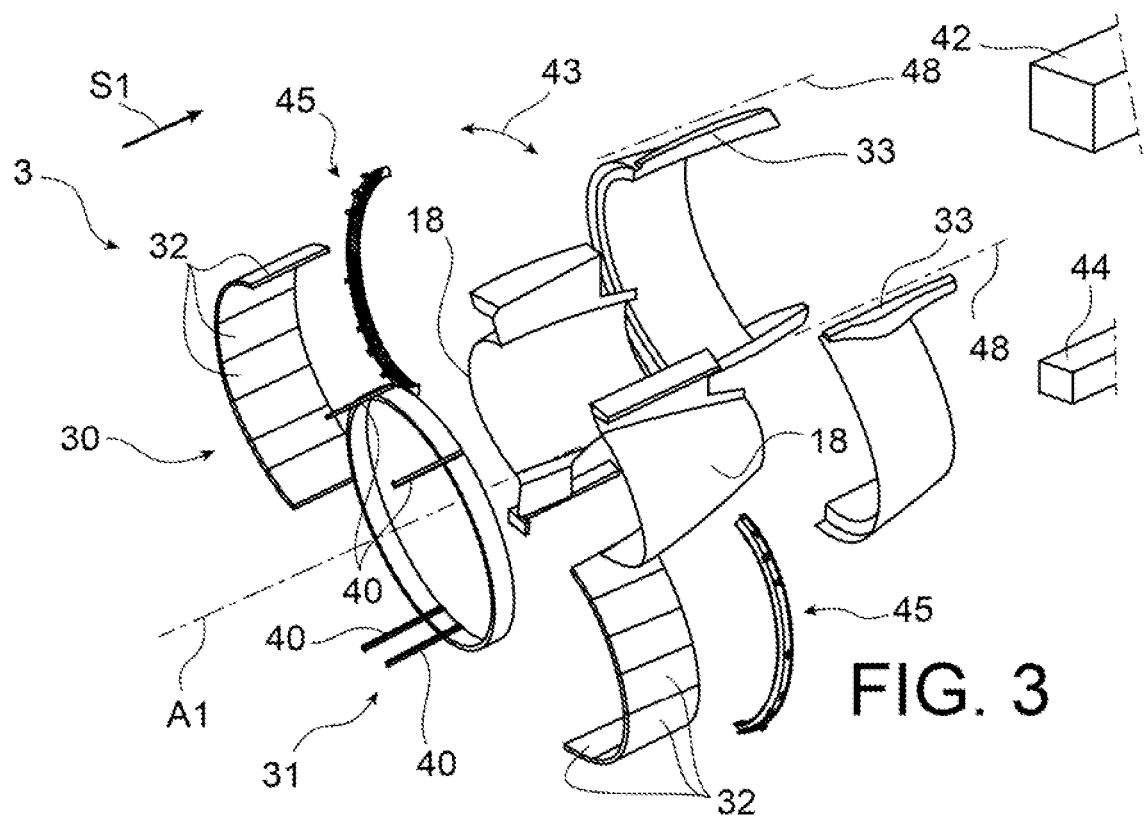
FIG. 3 is an exploded perspective view of a part of the nacelle of the propulsion unit shown on the previous figures, showing in particular the elements of the thrust reverser.
Figure 4:
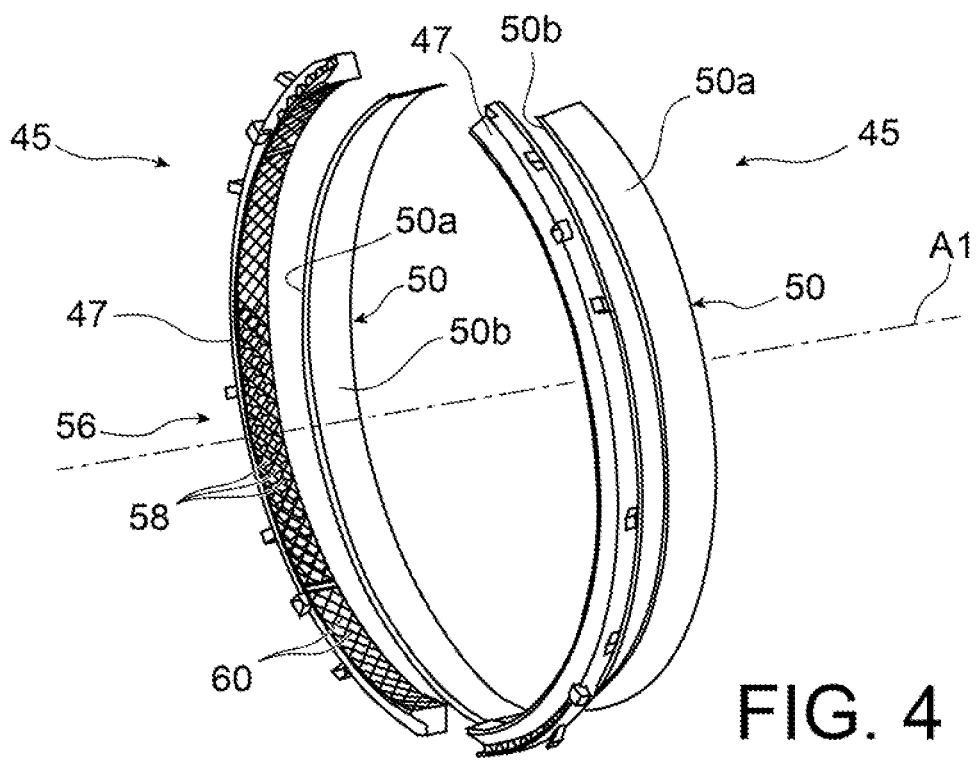
FIG. 4 is an exploded perspective view of the rear cascade-support structures equipping the reverser shown on the previous figure, according to a first preferred embodiment of the invention.

FIG. 3 shows an exploded perspective view of some elements of the nacelle 3, including a part of the fixed structure 31 of the reverser 30, which has a roughly annular shape centred on the axis A1. More precisely, in this first preferred embodiment of the invention, the fixed structure 31 has a closed-curve shape defining a roughly ring shape, locally following the external contour of the secondary duct 21B in the circumferential direction of the nacelle 43, in relation to the axis A1. The fixed structure 31 is also called the "fixed frame" of the reverser.

In this first preferred embodiment of the invention, the fixed structure 31 is equipped with elements for guiding the cascades 32 when they move between the advanced and retracted positions, these elements comprising axial rails 40. For example, these are two rails 40 secured to an upper part of the ring, and two other rails 40 secured to a lower part of this same ring. Here, the rails 40 are secured to the fixed structure 31 by their rear end, while their front end is secured to another casing (not shown on FIG. 3). The rails 40 thus fulfil a function of guiding the cascades 32 during the axial movement thereof, but also, in a thrust-reversal configuration, a function of absorbing aerodynamic forces, mainly radial and tangential.

FIG. 3 shows schematically the cascades 32, which succeed each other in the circumferential direction 43. Here, they are grouped together in two lateral assemblies each comprising a plurality of cascades 32, and each extending over an angular sector of around 180. The two lateral assemblies of cascades 32 are preferably separated laterally from each other at their ends facing in pairs, to provide upper and lower spaces respectively dedicated to the passage of the mast 42 and of a lower longitudinal beam 44.

This configuration is particularly well adapted in the case of a nacelle design in which the cowls 18 of the second portion are mounted articulated, the reverser 30 then having a so-called "D" architecture known by the English term "D-Duct". Nevertheless, the circumferential extent of the cascade assemblies 32 can easily be adapted according to the design of the reverser and of the nacelle, and can for example adopt a so-called "C" architecture, known by the English term "C-Duct", or a so-called "O" architecture known by the English term "O-Duct".

In a known manner, the fixed structure 31 includes members (not shown) forming radial and/or tangential and/or axial stops for the cascades 32.

One of the particularities of the invention, which will be detailed below, lies in the particular design of two rear cascade-support structures, referenced 45 and also called "rear cascade frames". Each of the two structures 45 extends circumferentially along its associated lateral assembly of cascades 32, over an identical or similar angular sector. The rear end of each cascade 32 is intended to be secured to its associated rear structure 45, by conventional securing means.

In a similar manner, front cascade-support structures (not shown) can be provided to secure the front end of the cascades.

On FIG. 3, the elements of the nacelle 3 are supplemented by the articulated cowls 18, 33, conferring the "D" architecture on the nacelle. In particular, the pivot axis 48 associated with each cowl 33 has been shown schematically, this pivot axis 48 being parallel or substantially parallel to the axis A1, and enabling the cowl 33 to rotate between an open maintenance position and a closed flight position, shown on FIG. 3.

FIGS. 4 to 8 show in more detail the design of the two rear structures 45 dedicated to supporting the cascades 32, according to the first preferred embodiment of the invention. Preferably, the two rear structures 45, right and left, have identical or similar designs, while being symmetrical with respect to a vertical longitudinal plane passing through the axis A1. Consequently, hereinafter, the description that will be made will apply to each of these two rear structures 45, one of the particularities of which is incorporating an acoustic function in order to reduce the intensity of noise given off by the propulsion unit.

First of all, each rear structure 45 has a two-part design, the first part corresponding to a structural main part in the form of a core 47, and the second part corresponding to a skin 50, referred to as acoustic skin and covering the core 47. The core 47 and the acoustic skin 50 are superimposed in the radial direction of the reverser, and both extend circumferentially over an identical or similar angular sector, corresponding to that of the rear structure 45 that they make up, namely over approximately 180 or over a slightly smaller value.

Figure 5:
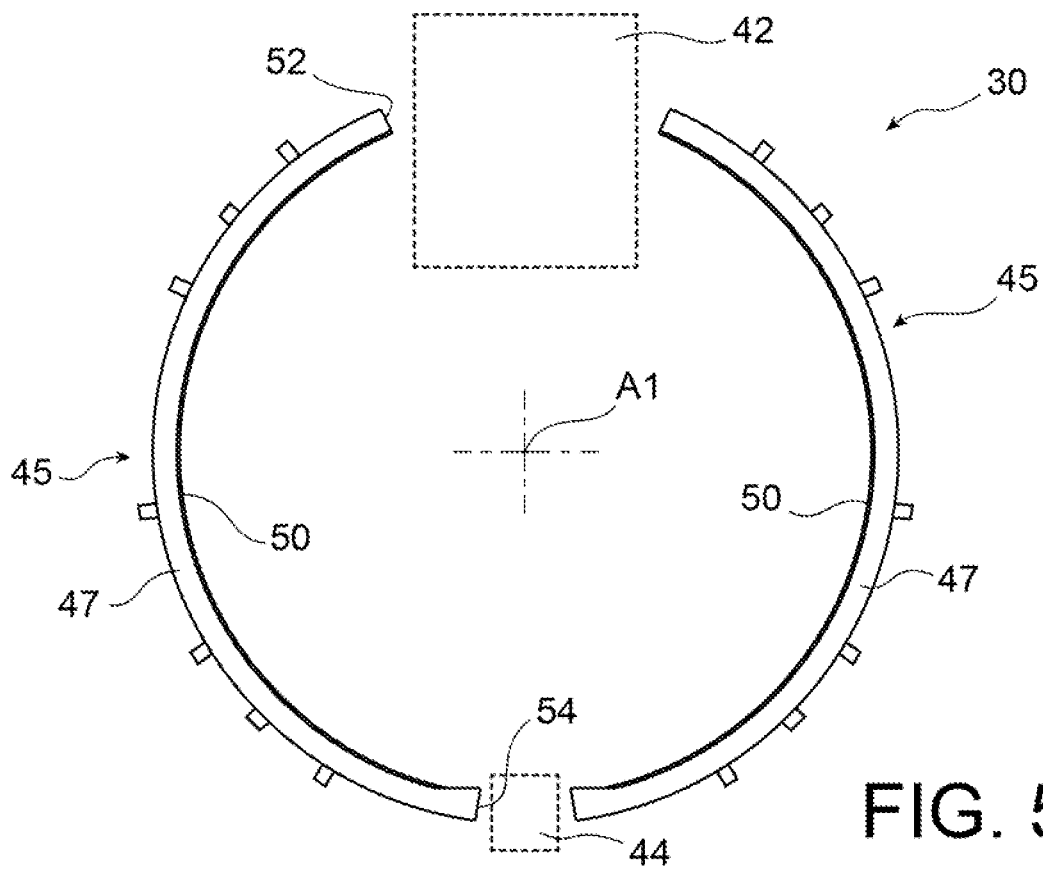
FIG. 5 is an axial view of the rear cascade-support structures shown on the previous figure.
Figure 6:
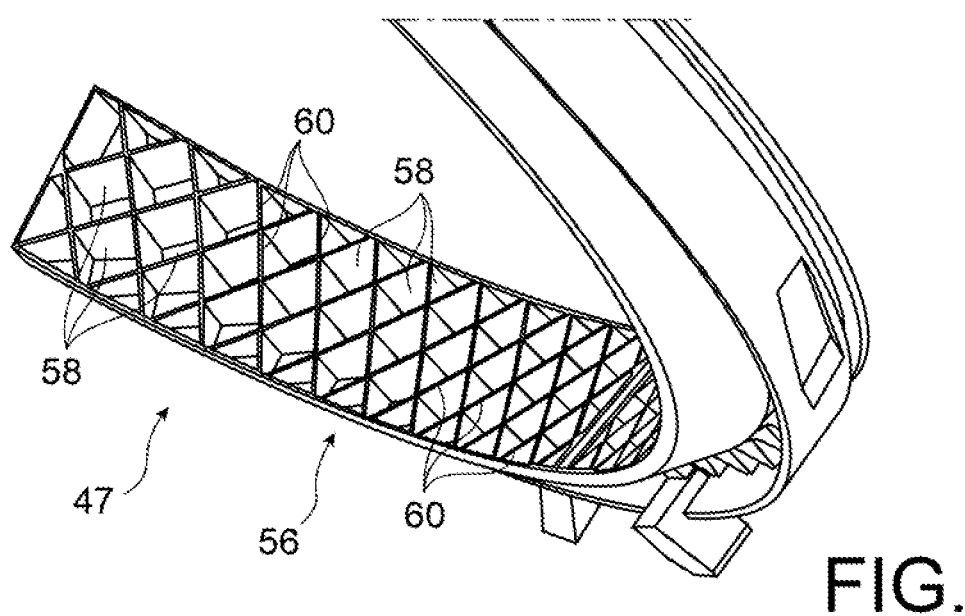
FIG. 6 is an enlarged perspective view of the core of one of the rear cascade-support structures shown on FIGS. 4 and 5.

As is more clearly visible on FIG. 5, the two rear structures 45 are preferably separated laterally from each other at their ends facing in pairs, to provide upper 52 and lower spaces 54 respectively dedicated to the passage of the mast 42 and of a lower longitudinal beam 44. It is however noted that the geometry and number of the rear structures 45 can be adapted according to the design of the nacelle, having here a D-shaped architecture.

Each rear structure 45 incorporates an acoustic absorption device 56, formed by associating a lattice of cells 58 formed in the core 47 and the acoustic skin 50 radially covering these cells 58. Each cell 58, also called an alveolus, extends radially or substantially radially, while being defined in the thickness of the core 47 by cell walls 60 produced in a single piece with this core. Consequently these cell walls 60, referred to as lateral cell walls, also form elements stiffening the core. They therefore advantageously participate in obtaining a structural single-piece part 45, offering an excellent compromise with regard to mechanical strength and mass.

The lateral cell walls 60 are preferably obtained by machining the core 47 in its thickness, this core preferably being metal. Alternatively, a solution by moulding, by additive manufacturing, or any other technique could be envisaged, without departing from the scope of the invention.

Each cell 58 of the lattice is therefore defined laterally by the walls 60, and has, radially outwards, a closed bottom, preferably also produced in a single piece in the core 47. At its radially internal ends, each cell 58 is covered by the skin 50, the first radially external surface 50a of which is located facing the radially internal ends of the cells 58. The first surface 50a of the skin 50 can be in contact with the cell walls 60, or a small radial clearance can be adopted between these elements 50a, 60, for example less than or equal to 1 mm.

Figure 7:
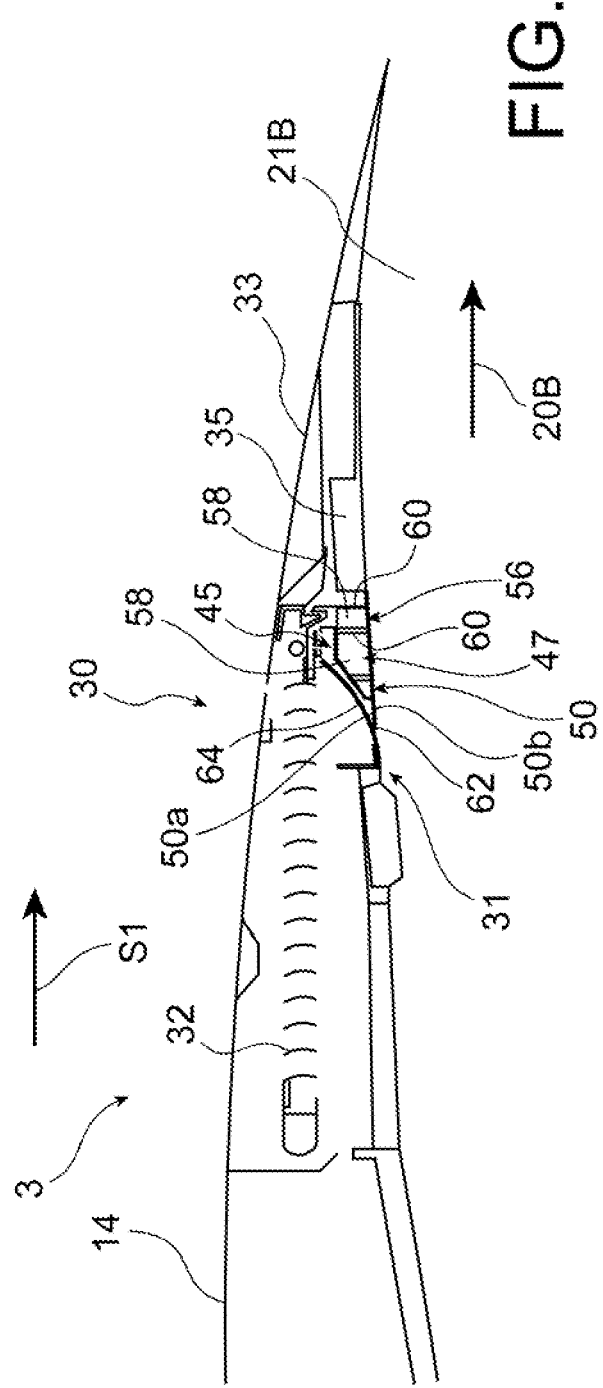
FIG. 7 is a schematic half-view in longitudinal section of a rear part of the propulsion unit shown on FIG. 1, in more detail, and still with the reverser in a direct-thrust configuration.

The smooth second surface 50b of the skin 50, opposite to the first surface 50a and therefore oriented radially inwards with respect to the axis A1, for its part delimits a radially external part of the secondary duct 21b, when the movable system is in an advanced direct-thrust position as shown on FIG. 7.

The walls 60 define cells 58 with conventional cross sections, for example square or hexagonal. Because of the lattice configuration, each wall 60 participates in the delimitation of a plurality of cells 58, on either side thereof. By way of indicative example, each cell 58 has a cross-section the two largest dimensions of which are each less than or equal to 60 mm, or even 50 mm, the cross section here being understood as a cross section in a plane orthogonal to a fictional cell axis passing through its bottom and its radially internal end closed by the skin 50.

The objective lies in the formation of an acoustic absorption device 56 of the type comprising an array of Helmholtz resonators, by virtue of the acoustic cells 58 forming these resonators. Thus the acoustic skin 50 has the porosity required for allowing the waves coming from the secondary duct 20b in the direction of the interior of the cells 58 to pass, and for enabling the resonator function to be obtained. By way of example, the skin 50 is produced from composite material, and has a design identical or similar to that of the acoustic skins already known for equipping other parts of the nacelle 3, such as the air inlet.

In the axial direction, the acoustic skin 50 extends all along the core 47, and its front axial end 62 can be extended forwards to come facing or in contact with a diversion edge 64 of the fixed structure 31, when the movable system adopts its advanced direct-thrust position shown on FIG. 7. In this position, the absence of clearance or the small clearance makes it possible best to maintain the secondary flow 20b in the secondary duct 21B, while limiting the leakages of air at the interface between the movable system and the fixed part 31 of the reverser.

Figure 8:
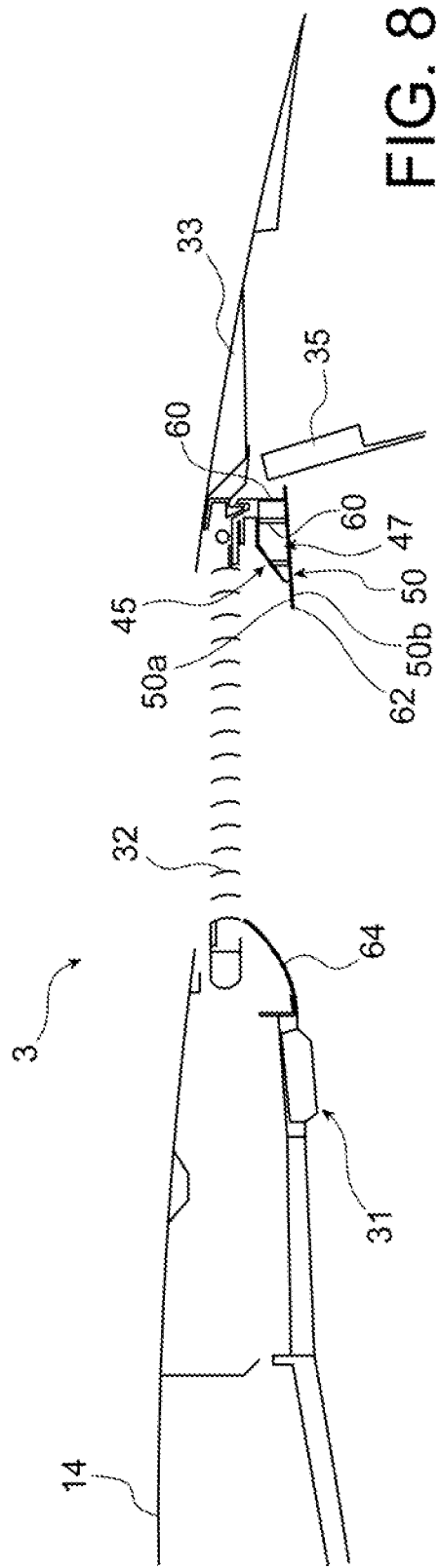
FIG. 8 is a schematic half-view in longitudinal section of a rear part of the propulsion unit shown on FIG. 2, in more detail, and still with the reverser in a thrust-reversal configuration.

The diversion edge 64 with which the skin 50 cooperates has a shape that splays radially outwards while going towards the rear, to delimit an airflow intended to pass through the cascades 32 when the movable system is in the retracted thrust-reversal position shown on FIG. 8. In other words, the diversion edge 64 gradually moves away from the axis A1 while going from front to rear, to guide/divert the air towards the cascades 32 in the thrust-reversal configuration.

Figure 9:
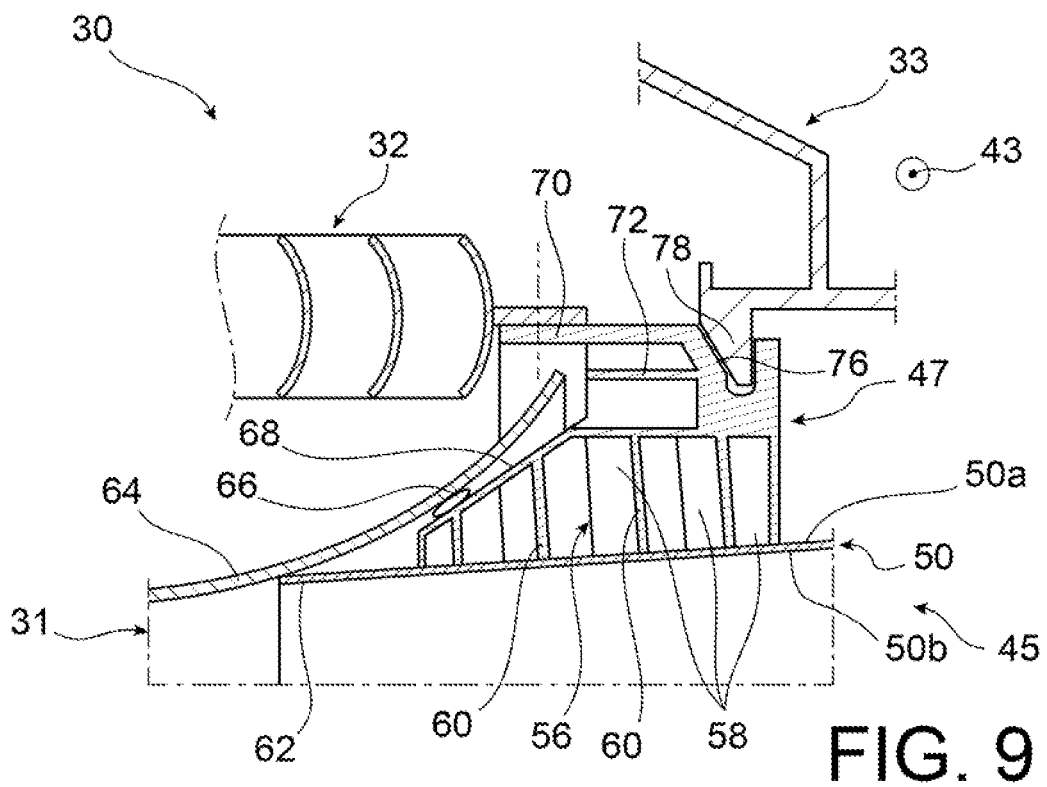
FIG. 9 is a half-view in perspective cut by a longitudinal plane, showing an additional functionality for the rear cascade-support structures.

To limit even more the leakages on the secondary duct 20B, a seal 66 can be arranged between the core 47 and the diversion edge 64, as has been shown schematically on FIG. 9. The seal 66 can be carried by the core 47 or the diversion edge 64, and is preferably in abutment on an inclined plane 68 of the core, having locally an orientation tangential or substantially tangential with respect to the curved diversion edge 64.

This FIG. 9 shows the securing of the rear end of the cascades 32 on a platform 70 of the core 47 arranged radially outwards with respect to the lattice of cells 58. Moreover, additional stiffeners 72 are shown arranged radially between the bottom of the cells 58 and the circular cascade-securing platform 70, these additional stiffeners 72 preferably being arranged axially or substantially axially, unlike the lateral cell walls 60 having a radial or substantially radial orientation with respect to the axis A1.

FIG. 9 shows another functionality of the rear structure 45, which consists of implementing the axial connection with the cowl 33, in its closed flight position. This is because the rear end of the core 47 comprises an axial connection member 76 in the form of an annular groove open radially outwards, cooperating with a complementary axial connection member 78 provided on a front end of the cowl 33. This member 78 preferably takes the form of a radial projection towards the inside, housed in the groove 76 to obtain the axial coupling in the closed position of the cowl 33. When the latter is opened to its open maintenance position, the projection 78 is extracted from the groove 76.

Figure 10:
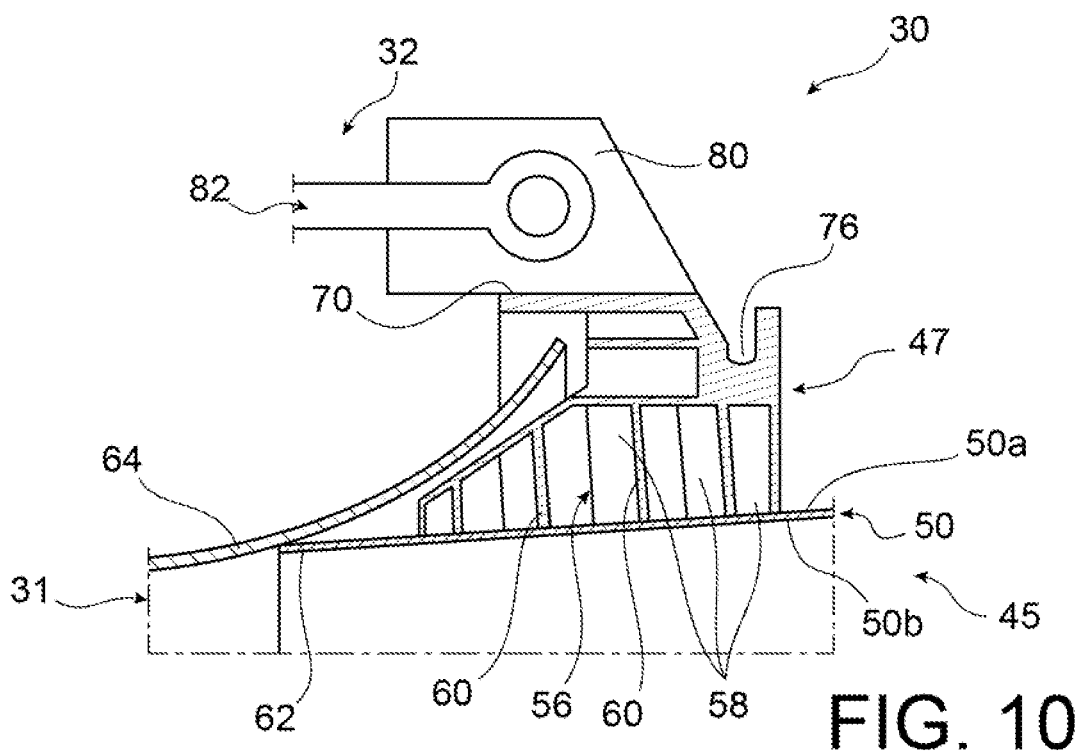
FIG. 10 is a half-view similar to the previous one, showing yet another additional functionality for the rear cascade-support structures.

FIG. 10 shows another functionality attached to the rear structures 45, namely that of providing on the core 47 one or more members 80 for connection with an actuator 82 of the reverser 30. These connection members 80, preferably produced in a single piece with the rest of the core 47, for example designed to project radially outwards from the platform 70. They make it possible to articulate the rear end of the actuators 82 of the reverser, in the form of hydraulic or electric jacks providing the translation of the movable system along the axis A1, relative to the fixed structure 31.

Figure 11:
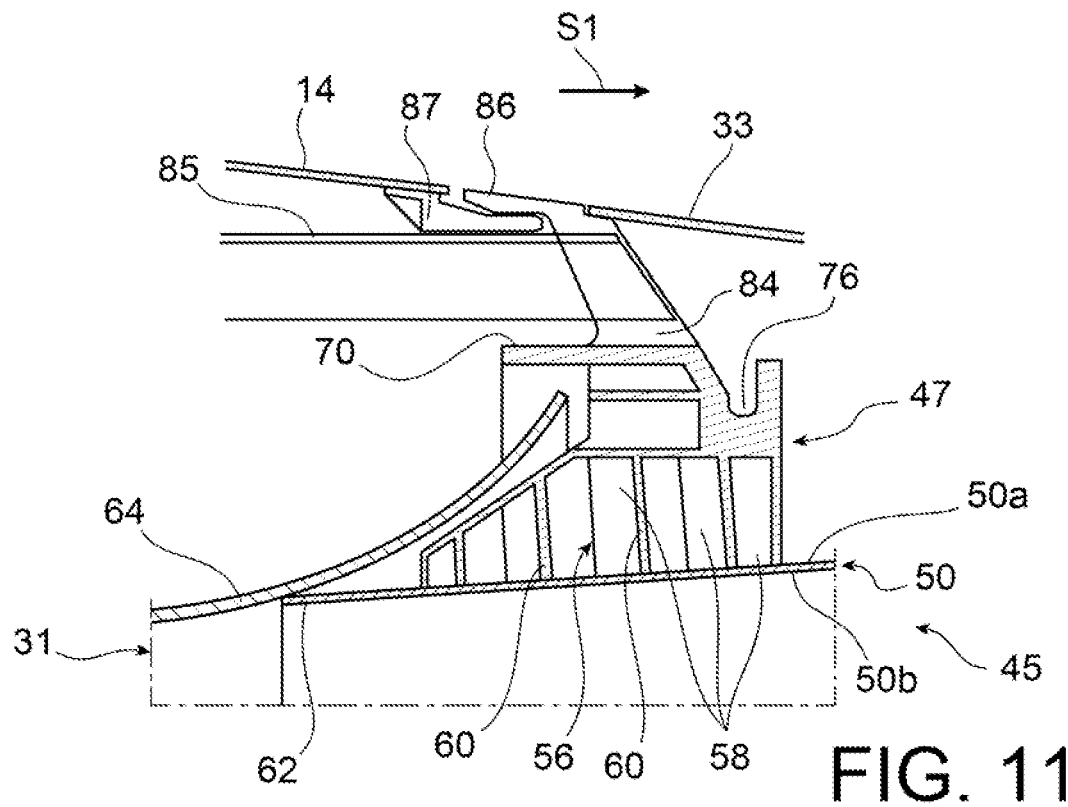
FIG. 11 is a partial half-view in longitudinal section, showing yet another additional functionality for the rear cascade-support structures.

Yet another functionality of the rear structures 45 is shown on FIG. 11, with the presence of one or more members 84 for connection with one or more tracks 85 for guiding in translation provided on the movable system, preferably between the diversion cascades or radially above these. These connection members 84 are also preferably projecting radially outwards from the platform 70, and also preferably produced in a single piece with the rest of the core 47.

Finally, the core 47 can be equipped with one or more radial centring members 86 of the movable system, one of the objectives of which is to confer the best possible aerodynamic continuity between the cowls 14 and 33 following each other in the axial direction. The centring members 86 can for example be arranged at the external radial ends of the connection members 84, and cooperate with complementary means 87 provided at the rear end of the cowls 14, as shown on FIG. 11.

Figure 12:
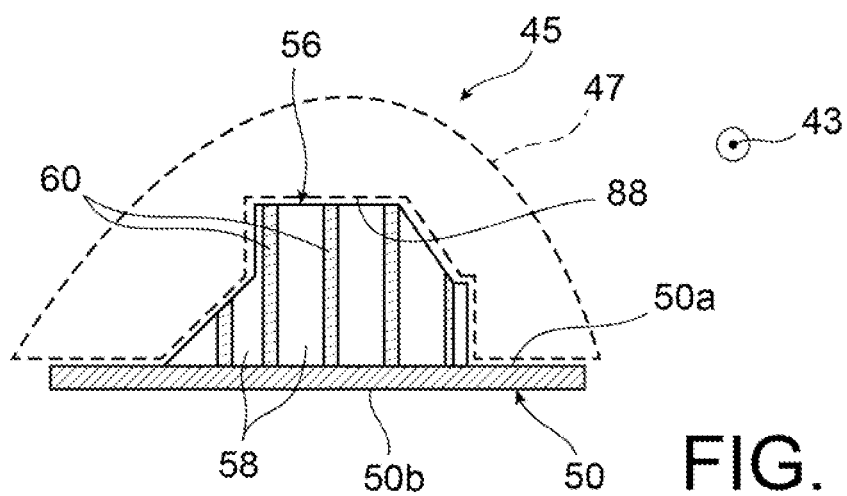
FIG. 12 is a half-view in perspective cut by a longitudinal plane, showing one of the acoustic skins according to a second preferred embodiment of the reverser.

FIG. 12 shows a second preferred embodiment of the invention, in which the lattice of cells 58 is no longer formed in the thickness of the core 47, but defined by cell walls 60 produced in a single piece with the skin 50, projecting radially inwards from the first surface 50a. The lattice of cells 58, incorporated in the skin 50, is then housed in a cavity 88 of the core 47, open radially inwards, and which extends in the circumferential direction 43.

Figure 13:
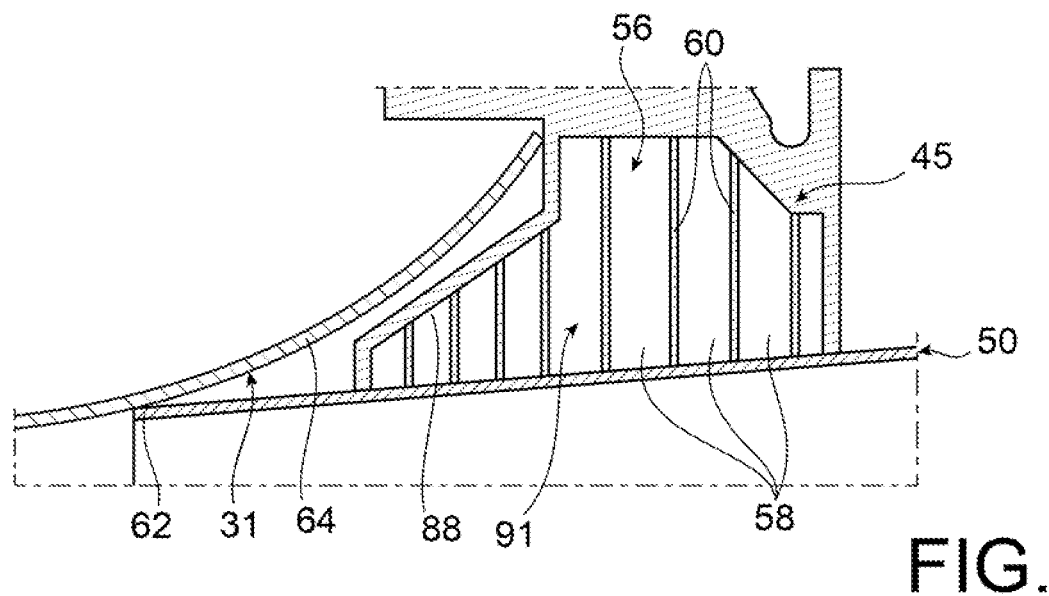
FIG. 13 is a half-view in longitudinal section, showing one of the rear cascade-support structures according to a third preferred embodiment of the reverser.

According to a third preferred embodiment shown on FIG. 13, the lattice of acoustic cells 58 is no longer secured to the core 47 or to the skin 50, but is formed by one or more cellular structures 91 attached between these two elements 47, 50, in one or more cavities 88 provided in the thickness of the core 47. These cellular blocks or structures 91, for example in honeycombs or similar elements, are thus gripped radially between the bottom of the cavities 88 and the first surface 50a of the acoustic skin 50.

Figure 14:
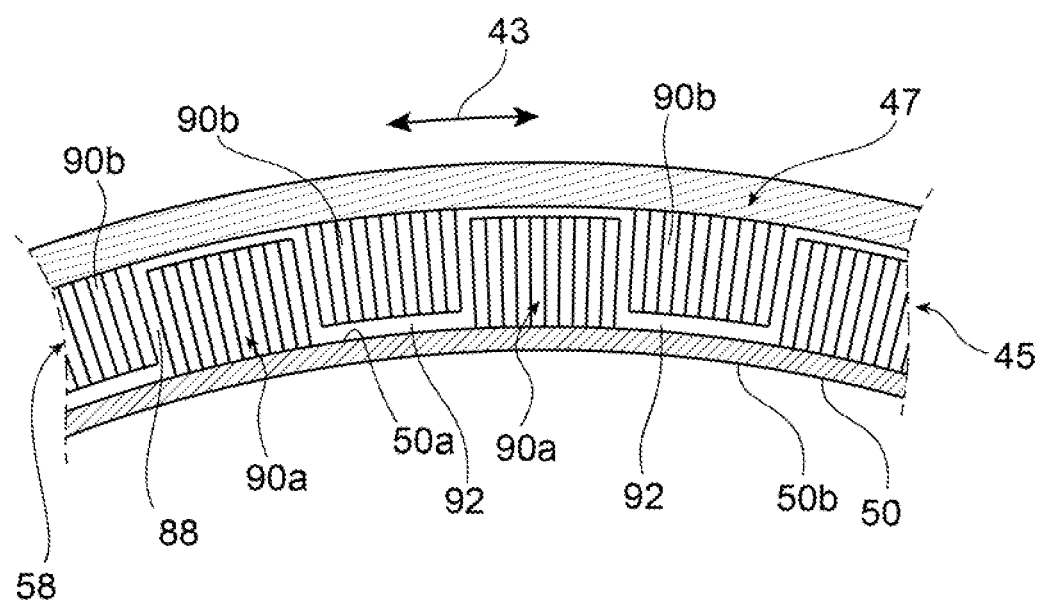
FIG. 14 is a partial view in cross section of one of the rear cascade-support structures, in a combination of the first and second preferred embodiments of the reverser.

Finally, FIG. 14 shows a combination between the first and second preferred embodiments described previously, wherein the first surface 50a of the skin 50 carries a plurality of blocks 90a circumferentially spaced apart from each other, and forming a part of the lattice of cells 58. Each block 90a or cellular structure is housed in a cavity 88 provided in the thickness of the core 47. The other part of this lattice is formed by a plurality of blocks 90b circumferentially spaced apart from each other and incorporated in the core 47, these cellular blocks 90b or structures being arranged in the free spaces 92 defined between the successive blocks 90a incorporated in the skin 50.

Of course, various modifications may be made by the person skilled in the art to the invention as just described, by way of non-limiting examples only, the scope of which is defined by the appended claims. For example, the thrust reverser 30 can alternatively have a C-shaped or O-shaped architecture.

The invention claimed is:

1. A thrust reverser for an aircraft propulsion unit, having a longitudinal central axis and comprising a fixed structure, at least one cowl and a plurality of diversion cascades, the cowl and the cascades forming a movable system able to move in translation with respect to the fixed structure along the longitudinal central axis, between an advanced direct-thrust position and a retracted thrust-reversal position, the movable system further comprising at least one rear cascade-support structure for supporting the cascades, wherein a rear end of at least several of the plurality of diversion cascades are secured on said at least one rear cascade-support structure, said at least one rear cascade-support structure extending in a circumferential direction of the thrust reverser, wherein said at least one rear cascade-support structure incorporates an acoustic absorption device comprising a lattice of cells and a skin covering the cells, the skin including a first surface arranged facing the cells, and a second surface opposite to the first, radially delimiting towards the outside a part of a secondary gas-flow duct, in the advanced direct-thrust position of the movable system, wherein the cowl is able to move in rotation about a pivot axis between a closed flight position and an open maintenance position, said at least one rear cascade-support structure comprising an axial connection member intended to cooperate with a complementary axial connection member provided on a front end of the cowl, when the latter is in the closed flight position.

2. The thrust reverser according to claim 1, wherein said at least one rear cascade-support structure includes a core extending in the circumferential direction of the reverser.

3. The thrust reverser according to claim 2, wherein, in said at least one rear cascade-support structure, the lattice of cells is at least partially defined by cell walls produced in a single piece with the core of said at least one rear structure, so as also to form elements stiffening said core.

4. The thrust reverser according to claim 2, wherein, in said at least one rear cascade-support structure, the lattice of cells is at least partially defined by cell walls produced in a single piece with the skin, and housed in at least one cavity of the core.

5. The thrust reverser according to claim 2, wherein, in said at least one rear cascade-support structure, the lattice of cells is at least partially defined by one or more cellular structures attached between the core and the skin, in at least one cavity of the core.

6. The thrust reverser according to claim 1, wherein said at least one rear cascade-support structure includes at least one of the following elements:
 a first member connecting with an actuator of the reverser;
 a second member connecting with a track for guiding in translation provided on the movable system; and
 a third member for radial centering of the movable system.

7. The thrust reverser according to claim 1, wherein the fixed structure includes a diversion edge that splays radially outwards while going towards the rear, to delimit an airflow intended to pass through the cascades when the movable system is in the retracted thrust-reversal position.

8. The thrust reverser according to claim 7, wherein the skin has a front axial end facing or in contact with the diversion edge of the fixed structure, when the movable system is in the advanced direct-thrust position.

9. A propulsion unit for an aircraft, comprising a turbine engine and a thrust reverser according to claim 1.

* * * * *